Aug. 7, 1962   J. GOTTSCHALK   3,048,092
CAMERA
Filed Nov. 21, 1960   4 Sheets-Sheet 1

INVENTOR
Johannes Gottschalk

BY Michael S. Striker
ATTORNEY

Aug. 7, 1962     J. GOTTSCHALK     3,048,092
CAMERA

Filed Nov. 21, 1960     4 Sheets-Sheet 2

INVENTOR
Johannes Gottschalk

BY Michael S. Striker
ATTORNEY

Aug. 7, 1962
J. GOTTSCHALK
3,048,092
CAMERA
Filed Nov. 21, 1960
4 Sheets-Sheet 3
Fig. 4
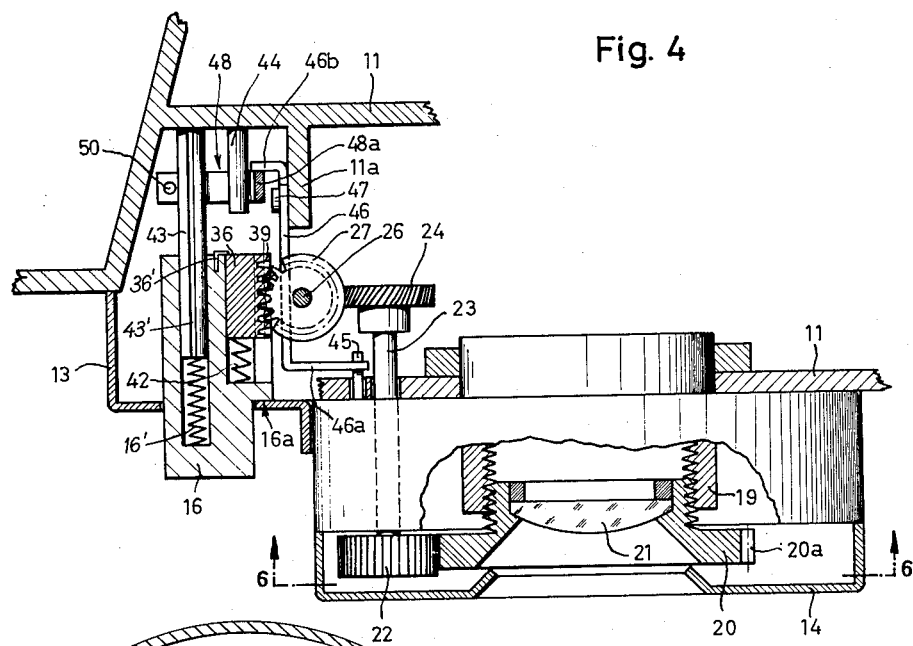
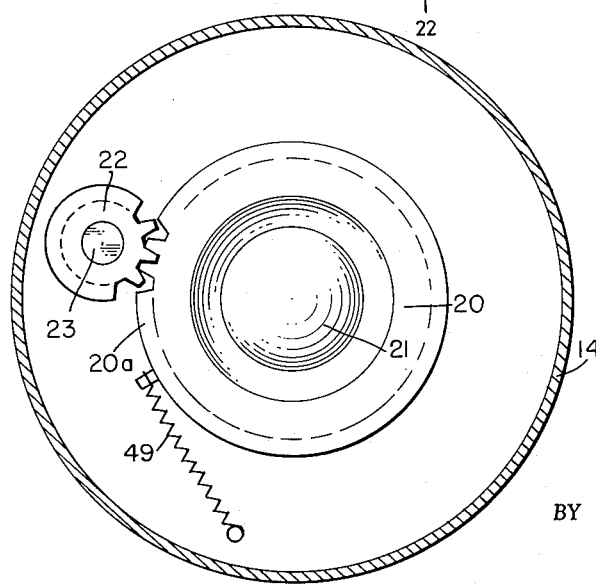
Fig. 6
INVENTOR
Johannes Gottschalk
BY Michael S. Striker
ATTORNEY Aug. 7, 1962 J. GOTTSCHALK 3,048,092
CAMERA
Filed Nov. 21, 1960 4 Sheets-Sheet 4

INVENTOR
Johannes Gottschalk
BY Michael S. Striker
ATTORNEY

United States Patent Office 3,048,092
Patented Aug. 7, 1962

3,048,092
CAMERA
Johannes Gottschalk, Reutlingen, Germany, assignor to Dangelmaier & Co., Reutlingen, Germany
Filed Nov. 21, 1960, Ser. No. 70,668
Claims priority, application Germany Nov. 21, 1959
8 Claims. (Cl. 95—45)

The present invention relates to cameras.

More particularly, the present invention relates to still cameras of the push-button type wherein one of a plurality of push-buttons is selected by the operator to set the objective for a predetermined distance between the subject and the camera.

Cameras of this type are not entirely satisfactory because the structures required to transmit movement of the push-buttons to the objective to adjust the latter occupy a large amount of space and prevent the camera from being made as small and compact as desired. Moreover, cameras of this type are difficult to manufacture with the desired degree of accuracy. For example, different transmission ratios may be provided in the transmissions between the several push-buttons and the objective, and because of the play which is necessarily present in such transmissions it is impossible to maintain a high degree of accuracy. Furthermore, with cameras of this type the structure for releasing the shutter so as to make an exposure is entirely separate from the push-button structure for selecting a given distance of the subject to the camera, and it is accordingly necessary while maintaining a selected push-button depressed with one hand to actuate the shutter release with the other hand, and of course this makes for a great inconvenience and also requires a considerable amount of care on the part of the operator in order to make proper exposures.

One of the objects of the present invention is to provide a push-button camera wherein only an extremely small amount of space is required for the structure which transmits the movement of the several push-buttons to the objective so as to set the latter.

Another object of the present invention is to provide a camera of the above type which does not require several transmissions of different transmission ratios.

A further object of the present invention is to provide in a camera of the above type a shutter release structure which is not entirely separate from the push-button structure and which in fact is automatically actuated by the push-button structure itself to release the shutter as part of the operation of the push-buttons and in the proper sequence so that the shutter is released only after the objective has been properly set.

It is a further object of the present invention to provide for a camera of the above type a structure which is very easily adjustable so as to provide the desired accuracy.

It is also an object of the present invention to provide a simple inexpensive structure which is rugged and which is reliable in operation and which can accomplish all of the above objects.

With the above objects in view the invention includes in a camera, a support means and an adjustable objective carried by the support means. An adjusting means is operatively connected with the objective means for focusing the latter, and a manually operable member is supported by the support means for movement along a given path through a given distance. A first transmission means is operatively connected with the objective adjusting means for actuating the latter. A means according to the present invention connects this first transmission means to the manually operable member for actuation by the latter only during the predetermined first fraction of the distance through which the manually operable member moves and for stopping the actuation of this first transmission means by the manually operable member during the continued movement of the latter through the remainder of its total distance of movement. A shutter release means is carried by the support means, and a second transmission means cooperates with this shutter release means for actuating the latter to release the shutter, this second transmission means being located in the path of movement of the manually operable member through the above-mentioned remainder of its total distance of movement after the actuation of the first transmission means has terminated, so that during movement of the manually operable member the objective will first be adjusted and thereafter, during the continued movement of the manually operable member, the shutter will be released so as to make an exposure.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is a fragmentary sectional plan view taken along line 4—4 of FIG. 1 in the direction of the arrows and illustrating the objective adjusting structure and part of the transmission which actuates this adjusting structure;

FIG. 6 is a fragmentary sectional elevation taken along line 6—6 of FIG. 4 in the direction of the arrows and showing the objective adjusting structure as it appears when looking at the front thereof.

Figure 1:
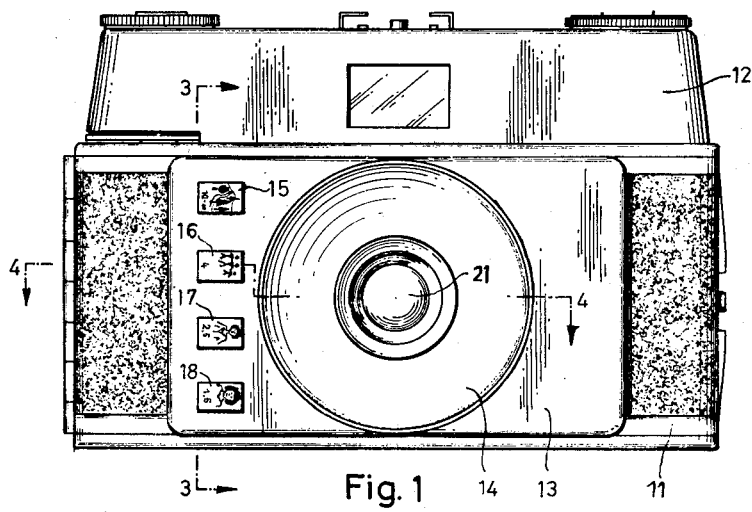
FIG. 1 is a front elevation showing the camera of the invention as it appears when looking toward the front of the camera.
Figure 2:
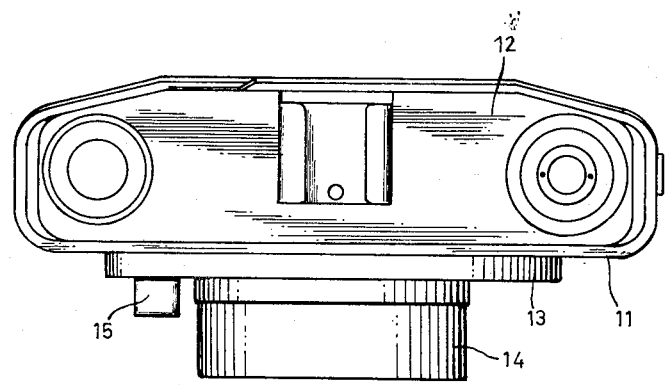
FIG. 2 is a top plan view of the camera of FIG. 1.

Referring now to FIGS. 1 and 2, the camera of the invention is shown in FIGS. 1 and 2 as the camera appears from the exterior. The camera of the invention includes a main camera housing 11 and an auxiliary upper housing portion 12 resting on the housing 11 and serving to house various components such as the view finder, etc. as is conventional. At the front of the camera there is a front plate 13 which forms part of the support means for the structure of the invention and which carries the objective housing 14 within which are housed such components as the diaphragm and shutter as is conventional. A plurality of manually operable members 15—18 in the form of push-buttons extend through openings of the front plate 13 and are located beside the objective, as is apparent from FIGS. 1 and 3. The front wall of the housing 11 is also formed with openings through which the manually operable members 15—18 slidably extend.

Referring now to FIG. 4, it will be seen that the objective includes an internally threaded tubular member 19 in which a lens-carrying ring 20 is threaded, these cooperating threads having a relatively large pitch so that the ring 20 will move to a substantial axial distance even though it turns through a relatively small angle, and the ring 20 is shown carrying one of the lenses 21 of the objective. An adjusting means is provided for adjusting the objective so as to focus the latter for different distances of the subject to the camera, and this adjusting means includes the outer peripheral teeth 20a located along the exterior of the ring 20 so that the latter forms a gear of the adjusting means. A pinion 22 meshes with the teeth 20a of the ring 20, and this pinion 22 is fixedly carried by a shaft 23 which is supported for rotary movement by the support means formed in part by the front wall 11, as is indicated in FIG. 4. The shaft 23 passes through the housing 14 and the structure therein for controlling the exposure time and the exposure aperture, and at its rear end which is located within the housing 11 the shaft 23 carries a gear 24 which is provided with helical teeth and which meshes with a gear 25 (FIG. 5) which is located in a plane at right angles to the gear 24 which also has helical teeth meshing with those of the gear 24 so that the gears 24 and 25 can turn each other while being located in mutually perpendicular planes.

A transmission means is provided for actuating the adjusting means which adjust the objective, and this transmission means includes the vertical shaft 26 which is supported within the housing 11 for rotary movement by any sutable bearings of the support means, and the gear 25 is fixed to the shaft 26.

Figure 5:
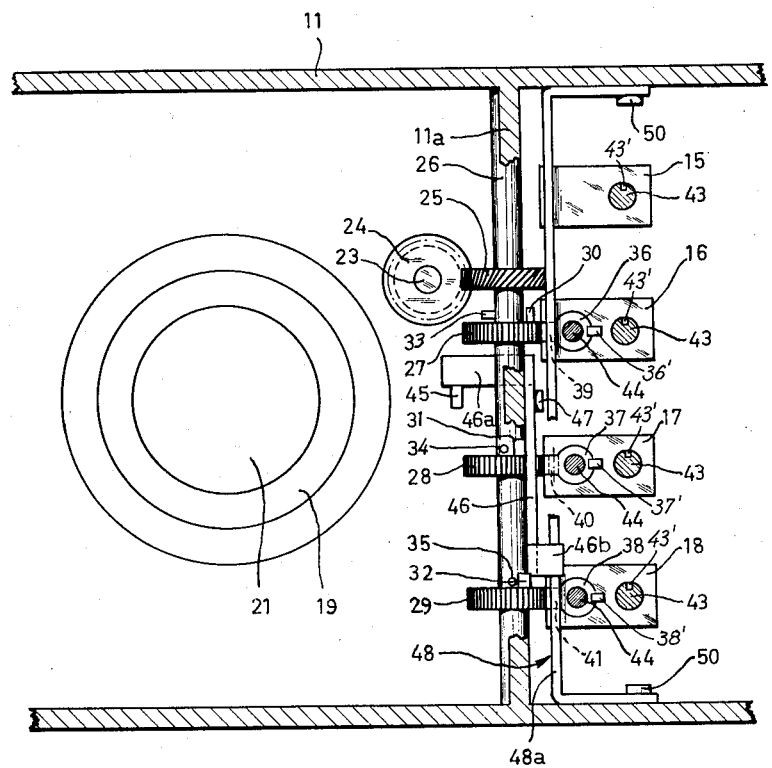
FIG. 5 is a fragmentary sectional elevation taken along line 5—5 of FIG. 3 in the direction of the arrows and showing the several transmissions which cooperate with the several push-buttons.

A plurality of transmission means are provided for transmitting the movement of the manually operable members 16—18 to the adjusting means, and these transmissions include the gears 27—29 which are freely turnable on the shaft 26 while being prevented from axial movement with respect thereto. Thus, suitable collars may be carried by the shaft 26 and they engage the several gears 27—29 to prevent axial movement thereof while freeing the same for angular movement with respect to the shaft 26 . The several transmission means include a first series of transmission pins 30—32 respectively fixed to the upper sides of the gears 27—29, as viewed in FIG. 5, and extending upwardly therefrom parallel to the shaft 26, and the several transmissions also include a second series of pins 33—35 fixed to the shaft 26 and extending radially therefrom, these several pins 33—35 being respectively located in the paths of turning movement of the pins 30—32 when the gears 27—29 which carry these pins are turned upon actuation of the manually operable members 16—18, respectively. When the structure is at rest the several gears 27—29 have predetermined angular positions, and these gears are in these rest positions as illustrated in FIG. 5. As is apparent from FIG. 5 in the rest position of the gears 27—29 the several pins 30—32 are respectively located at different angular distances from the several pins 33—35. Thus, it will be seen that in the rest position of the part shown in FIG. 5 the pins 32 and 35 engage each other while the pins 31 and 34 are located at a certain distance from each other and pins 30 and 33 are spaced from each other by a distance greater than that between the pins 31 and 34.

Each of the manually operable members 16—18 is formed, as shown most clearly for the member 16 in FIG. 4, with a longitudinal groove extending from its rear end toward but terminating short of its front end which is accessible to the operator, and within each of these grooves is located a transmission member which in the illustrated example is in the form of a rack. Thus, FIG. 4 shows in the groove of the member 16 a rack composed of a cylindrical portion 36 and an elongated toothed portion 39 extending longitudinally along and being integral with the cylindrical portion 36. Thus, the groove has an inner cylindrical portion and a communicating longitudinal portion forming a lateral extension of the cylindrical portion and extending to the right face of the manually operable member, as shown for the member 16 in FIG. 4. The cylindrical configurations of the grooves and the lateral extensions thereof are particularly apparent from FIG. 5. Thus, as may be seen from FIG. 5, the manually operable member 16 carries a rack having the cylindrical portion 36 and the tooth portion 39, the manually operable member 17 carries a rack having a cylindrical portion 37, and the toothed portion 40, and the manually operable member 18 carries a rack having the cylindrical portion 38 and the toothed portion 41 integral therewith. These racks respectively mesh with the several gears 27—29 described above.

As is apparent from the above description the several racks are respectively slidable with respect to the several manually operable members which carry them in grooves of these manually operable members, and each of the manually operable members carries a stop means which limits the rearward movement of the rack carried thereby. Thus, as may be seen from FIG. 4, the manually operable member 16 is provided with a stop means 36′ in the form of an angle member one leg of which is embedded within the member 16 and the other leg of which slightly overlaps the rear end of the cylindrical portion 36 of the rack 36, 39. In the same way all of the manually operable members carry stop means, respectively, for limiting the rearward movement of the several racks and thus these racks cannot move rearwardly beyond hte manually operable members. In addition, the manually operable members 16—19 are respectively provided with spring means for urging the several racks rearwardly into engagement with the stop means, and FIG. 4 shows the spring 42 located in the groove of the member 16 and urging the rack 36—39 rearwardly into engagement with the stop means 36′.

Figure 3:
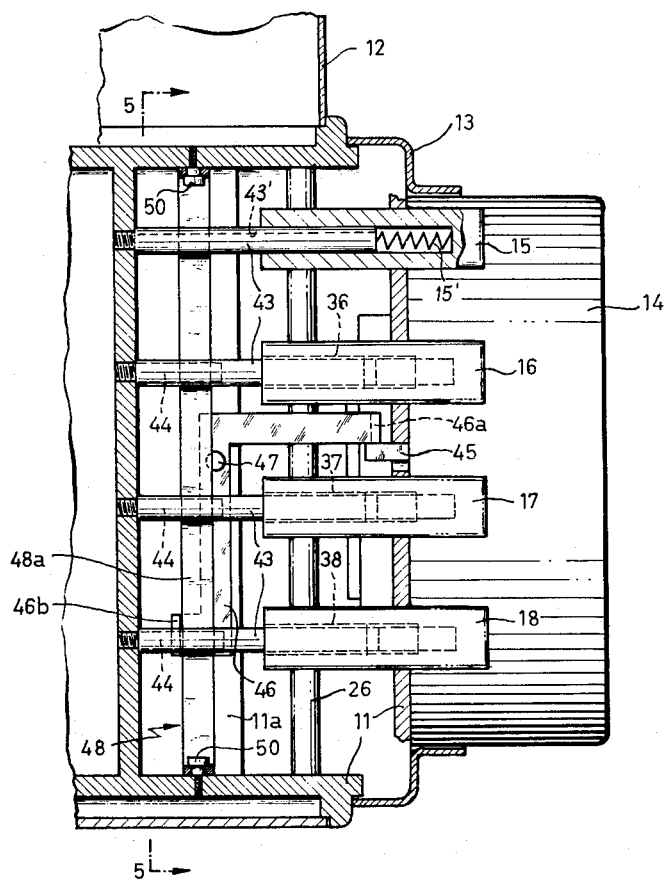
FIG. 3 is a fragmentary sectional view taken along line 3—3 of FIG. 1 in the direction of the arrows and showing the push-button structure and the supporting and guiding means therefor.

The structure which supports and guides the several manually operable members 15—18 for forward and rearward linear movements includes the vertical housing wall shown at the left in FIG. 3 and the plurality of guide pins 43 fixedly carried by this housing wall. The several guide pins 43 respectively extend slidably into bores which are respectively formed in the several manually operable members 15—18, and in order to prevent air from benig trapped in these bores in advance of the guide pins 43, these guide pins are respectively formed with axial grooves 43′ (FIG. 4). The several manually operable members 15—18 are shown in their forward rest positions in FIGS. 3 and 4, and in order to locate the members 15—18 in their forward rest positions the members 15—18 respectively carry springs in the bores which respectively receive the pins 43, these springs acting on the front ends of the pins 43, respectively, and on the closed ends of the bores opposite the front ends of the pins 43, respectively, so as to urge the manually operable members 15—18 forwardly to their rest positions as indictaed in FIGS. 3 and 4. It will be noted that each manually operable member is provided with a shoulder which engages the inner surface of the front plate 13 to limit the forward movement of the manually operable member. Thus, FIG. 4 shows the spring 16′ in the bore of the member 16 engaging the pin 43 to locate the pin 16 in its forward rest position where the shoulder 16a of the member 16 engages the inner surface of the plate 13, and FIG. 3 shows the spring 15′ of the member 15 which operates in the same manner, and of course the members 17 and 18 are provided with similar springs and have similar shoulders so that they operate in the same way and are located in their rest positions in the same way.

The support means of the invention formed by the walls of the housing 11, for example, carries an additional stop means which cooperates with the several transmission members formed by the racks in the grooves of the manually operable members 16—18, and this additional stop means is formed by the plurality of pins 44 which are fixedly carried by the support means and which are coaxial with the cylindrical portions 36—38 of the several racks. As may be seen from FIG. 4, when the manually operable member 16 is moved rearwardly, the rack 36, 39 will move rearwardly with the member 16 until the pin 44 engages the cylinder portion 36 of the rack 36, 39 and then during the continued rearward movement of the manually operable member 16, the rack 36 will remain stationary while the spring 42 is further compressed by the operator, and of course the spring 16′ will also be further compressed. The several racks all operate in the same way. Thus, the operator will select one of the buttons 16—18 and move it rearwardly, and during this rearward movement through a predetermined distance along the straight path the rack carried by the selected button will move with the button only until the rack is engaged by one of the stop pins 44 and then the rack will remain stationary while the selected button continues to move rearwardly. Thus, it will be seen that the grooves of the several manually operable members as well as the stop means such as the stop means 36' shown in FIG. 4 provide a means which connects the transmission members formed by the racks to the manually operable members for movement therewith only during a predetermined first fraction of the total movement of the manually operable members while the stop means 44 are then capable of stopping the racks while the manually operable members 16—18 continue to move toward the rear. For reasons pointed out below the manually operable memebr 15 is only guided for movement by the upper pin 43 shown in FIG. 3 and is not provided with any groove or rack and does not have any stop pin 44 to cooperate therewith. The member 15 is simply a manually operable member which is moved to the rear in opposition to the spring 15' and which will be returned to its rest position by spring 15'.

The housing 14 houses a conventional shutter structure, as was pointed out above, and the shutter release structure is also conventional and includes the pin 45 shown in FIG. 4 extending freely to the rear of the housing 14 through a suitable cutout in the wall of the housing 11 which is located just to the rear of the housing 14, as viewed in FIG. 4. When the element 45, shown also in FIG. 3, is moved downwardly the shutter will be released in a well known manner. A lever means is provided for acting on the shutter release means 45 in order to trip the latter, and this lever means is formed by the bell crank lever 46 whose configuration is shown most clearly in FIGS. 3 and 4. The lever 46 is pivotally supported by a pin 47 which is carried by a rib 11a of an interior wall of the camera housing 11, and the lever 46 is provided at its upper front end with a laterally extending portion 46a overlying the shutter release means 45 and at its lower rear end with an additional laterally extending projection 46b which extends in a direction opposite to the projection 46a and which is located behind the vertical arm 48a of a bail 48. The bail 48 together with the lever 46 form a transmission means for transmitting movement of the selected one of the manually operable members 15—18 to the shutter release means 45. The bail 48 has upper and lower arms slidably engaging upper and lower walls of the housing 11, and pivot members 50 are threadedly carried by these upper and lower walls and extend through aligned bores of the horizontal arms of the bail 48 so that in this way the bail 48 is carried by the common support means for turning movement about the common vertical axis of the pivots 50 which are shown in FIGS. 3 and 5.

As will be apparent from FIG. 5, the several stop means 36'—38' carried by the manually operable members 16—18, respectively, overlap the cylindrical portions 36—38 of the several racks only to a small extent and are never engaged by the additional stop means formed by the pins 44.

Referring to FIG. 6, it will be seen that within the housing 14 is located a spring 49 one end of which is fixed to a stationary pin of the housing 14 and the other end of which is fixed to a projection of the ring 20 so as to turn the latter to a predetermined rest position. When the ring 20 turns under the influence of the spring 49, the gear 22 turns and acts through the shaft 23 and gear 24 on the gear 25 so as to turn the shaft 26, and the latter shaft will turn until the pin 35 engages the pin 32 of the pinion 29 which meshes with the rack carried by the manually operable member 18, so that engagement between the pins 32 and 35 determines the rest position of the objective. Of course, each of the springs 42 located in the grooves of the several manually operable members 16—18 is stronger than the spring 49 so that until the several racks are respectively engaged by the several stop pins 44 during rearward movement of the several operable members 16—18, the several racks will remain stationary with respect to the several manually operable members while acting on the objective in opposition to the spring 49 inasmuch as the latter is substantially weaker than the springs 42. It is only when the several manually operable members are returned to their rest positions by the several springs which cooperate with the guide pins 43 that the spring 49 is free to act on the objective to return it to its rest position.

In this rest position of the objective, it is focused at infinity, and when the operator wishes to make an exposure with the objective focused at infinity, the operator selects the manually operable member 15 to operate the camera. Thus, it will be seen from FIG. 1 that the manually operable member 15 carries a landscape scene and is provided with the indicia 10–∞, signifying a range of 10 meters to infinity, and thus when an exposure is to be made under these conditions, the operator simply moves the pin 15 rearwardly in opposition to the spring 15' until the rear end of the button 15 engages the bail 48 to turn the latter and act through the lever 46 on the member 45 so as to trip the shutter and make the exposure. The member 15 simply returns under the influence of the spring 15' to its rest position and of course the objective did not require any adjustment since in its rest position it is focused at infinity.

The manually operable member 16 carries markings indicating a group of people and carries the numeral 4 indicating that the member 16 is to be actuated where the distance of the subject from the camera is at an average of 4 meters. When the member 16 is moved rearwardly by the operator the rack 36—39 will turn the pinion 27 on the shaft 26. This movement will continue without any turning of the shaft 26 until the pin 30 shown in FIG. 5 engages the pin 33, and then the shaft 26 will be turned so as to turn the gear 25 and thus act through the adjusting means 22—24 on the ring 20 so as to turn the latter in opposition to the spring 49 and thus adjust the objective so that it is focused for a distance of the subject from the camera of 4 meters. When the objective is focused at this distance the cylindrical portion 36 of the rack 36—39 will have engaged the upper stop pin 44 aligned with the cylindrical portion 36 so that further adjustment of the objective will terminate while the manually operable member 16 continues to move rearwardly and only after engagement of the rack 36, 39 with the pin 44 will the pushbutton 16 engage and turn the bail 48 so as to make the exposure.

The manually operable member 17 shows a person and carries the indicia 2.5 so as to indicate that this button is to be selected for an average distance between the subject and camera of 2.5 meters, and when the member 17 is selected by the operator the above-described operation will take place except that at this time the rack 37, 40 will cooperate with the gear 28 to turn the latter, and the pin 31 will engage the pin 34 to turn the shaft 26 through a larger angle than this shaft is turned upon actuation of the member 16, so that as a consequence the ring 20 is turned through a greater angle and the objective is thus set for the desired distance. When the objective has been set for a distance of 2.5 meters between the subject and the camera the cylindrical portion 37 of the rack 37, 40 will have just moved into engagement with the intermediate stop pin 44, and then during the continued rearward movement of the push-button 17 the latter will engage and turn the bail 48 so as to trip the shutter. Of course, after each tripping of the shutter the pin 45 returns to the position shown in FIG. 3 and turns the lever 46 in a counterclockwise direction about the pin 47, as viewed in FIG. 3, so that the bail 48 is always positioned to be turned by whichever push-button is selected by the operator.

The lowermost manually operable member 18 is selected for making portraits as is indicated by the head of a person which is located on the button 18, and this button carries the numeral 1.5 indicating that the button 18 is to be actuated when the average distance between the camera and the subject is 1.5 meters, and of course during the entire rearward movement of the pin 18 by the operator the shaft 26 will be turned since in the rest position of the button 18 the pin 32 engages the pin 35, as shown in FIG. 5, and thus the movement of the member 18 to the rear by the operator will turn the ring 20 to the greatest degree and will thus set the objective for the smallest distance between the subject and the camera.

Thus, it will be seen that with the structure of the invention the operator only requires a single button which he depresses in order to adjust the focus of the camera as well as to release the shutter so as to make the exposure. It will be seen that with the structure of the invention the use of the several pins 30—35 permits complex transmissions of different transmission ratios to be eliminated. Moreover, it is an extremely simple matter to turn the several stop pins 44 so as to adjust their axial positions and thus very accurately adjust the setting of the objective when the rack carried by the manually operable members stops moving with the latter, so that in this way a high degree of accuracy is guaranteed in a very simple manner. It will furthermore be noted that the structure of the invention requires only a small amount of space and is extremely compact so that the camera which includes the structure of the inventiton can be made quite small.

Of course, many conventional parts of the camera have not been described above since they have nothing to do with the invention. Thus, the camera will include conventional view finder structure as well as conventional shutter cocking and film transporting structure.

It will be understood that each of the elements described above, or two or more together, may also find a useful application in other types of camera differing from the type described above.

While the invention has been illustrated and described as embodied in push-button camera, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, support means; adjustable objective means carried by said support means; adjusting means operatively connected with said objective means for setting the latter; a plurality of manually operable members supported by said support means for respective movement along a plurality of given paths through a given distance along each path; a plurality of transmission means equal to the number of said manually operable members and all being operatively connected with said adjusting means for actuating the latter when any one of said plurality of transmission means is operated, said plurality of transmission means respectively providing said objective through said adjusting means with a plurality of different settings; means connecting said plurality of transmission means respectively with said pluraltiy of manually operable members for respective actuation by the latter only during a predetermined first fraction of the distance through which each of said manually operable members moves and for stopping the actuation of said plurality of transmission means by said plurality of manually operable members during the continued movement of each of the latter through the remainder of said distance; shutter release means carried by said support means; and an additional transmission means cooperating with said shutter release means for actuating the latter to release the shutter, said additional transmission means being located in the path of movement of all of said manually operable members when each of the latter moves through said remainder of said distance so that the operator may select one of said manually operable members to provide said objective with a selected setting during the initial part of the movement of said one manually operable member and for releasing the shutter during the continued movement of said one manually operable member through said remainder of said distance through which said member moves.

2. In a camera as recited in claim 1, an additional manually operable member carried by said support means for movement only into engagement with said additional transmission means for actuating the latter without actuating any transmission means which operates on said adjusting means, said objective means having an initial rest position providing a setting different from all of the settings provided by said plurality of transmission means, whereby said additional manually operable member may be actuated to release the shutter when the operator selects the initial setting of said objective means when the latter is at rest.

3. In a camera, in combination, support means; a manually operable member guided by said support means for movement along a predetermined path; a transmission member carried by said manually operable member for movement with respect thereto in the direction of movement of said manually operable member; first stop means carried by said manually operable member and engaging said transmission member to limit the movement of the latter with respect to said manually operable member in the direction of movement of the latter along said path; spring means carried by said manually operable member and urging said transmission member against said first stop means; second stop means carried by said support means in the path of movement of said transmission member to engage the latter and hold the same stationary in opposition to said spring means while said manually operable member continues to move along said predetermined path; first transmission means actuated by said transmission member during movement of the latter up to said second stop means for setting an objective of the camera; and second transmission means actuated by said manually operable member after said second stop means holds said transmission member stationary for releasing a shutter of the camera.

4. In a camera, in combination, support means; an elongated manually operable member carried by said support means and guided thereby for longitudinal movement, said manually operable member having a front end accessible to the operator and an opposite rear end and said manually operable member being formed with a longitudinal groove extending from said rear end thereof toward but terminating short of said front end thereof; a transmission member in said groove; first stop means carried by said manually operable member and cooperating with said transmission member for limiting movement thereof toward the rear end of said manually operable member; spring means carried by said manually operable member and engaging said transmission member for urging the latter toward said rear end of said groove; second stop means carried by said support means in the path of movement of said transmission member when said manually operable member is engaged at its front end by the operator and moved rearwardly, said second stop means engaging said transmission member and holding the latter stationary in opposition to said spring means while said manually operable member continues to move rearwardly; first transmission means actuated by said transmission member until the latter engages said second stop means for focusing an objective of the camera; and second transmission means actuated by said manually operable member after said transmission member engages said second stop means for releasing a shutter of the camera.

5. In a camera, in combination, support means; an elongated manually operable member carried by said support means and guided thereby for longitudinal movement, said manually operable member having a front end accessible to the operator and an opposite rear end and said manually operable member being formed with a longitudinal groove extending from said rear end thereof toward but terminating short of said front end thereof; a rack slidable in said groove; first stop means carried by said manually operable member and cooperating with said rack for limiting movement thereof in said groove toward the rear end of said manually operable member; spring means carried by said manually operable member and urging the latter rearwardly in said groove into engagement with said first stop means; second stop means carried by said support means in the path of movement of said rack when said manually operable member is moved rearwardly by the operator for engaging and stopping the movement of said rack while said manually operable member continues to move rearwardly, said second stop means holding said rack stationary in opposition to said spring means; first transmission means actuated by said rack during rearward movement thereof with said manually operable member for focusing the objective of the camera; and second transmission means actuated by said manually operable member after said second stop means engages said rack for releasing a shutter of the camera.

6. In a camera, in combination, support means; a plurality of elongated manually operable members carried by said support means and guided for longitudinal movement thereby, each of said manually operable members having a front end accessible to the operator and an opposite rear end being formed with a longitudinal groove extending from said rear end toward but terminating short of said front end thereof; a transmission member located in each of said grooves; spring means carried by each manually operable member and cooperating with the transmission member in said groove thereof for urging said transmission member toward the rear end of said manually operable member; a plurality of first stop means respectively carried by said plurality of manually operable members and respectively cooperating with said plurality of transmission members for limiting rearward movement thereof by the plurality of spring means in the plurality of grooves, respectively; a plurality of second stop means carried by said support means respectively in the paths of movement of the plurality of transmission members during rearward movement of said transmission members with said manually operable members when the latter are moved rearwardly, said plurality of second stop means cooperating with said transmission members for maintaining the latter stationary in opposition to said plurality of spring means, respectively, while the plurality of manually operable members continue to move rearwardly; an adjustable objective; adjusting means cooperating with said objective for setting the latter; a plurality of transmissions respectively cooperating with said plurality of transmission members to be actuated thereby during rearward movement of said manually operable members, respectively, and said plurality of transmissions cooperating with said adjusting means for actuating the latter to different extents depending upon which of said manually operable members is selected for actuation by the operator so that the objective will be set differently according to the manually operable members selected by the operator; a bail turnably carried by said support means and having an arm located in the path of movement of all of said manually operable members after the transmission members carried thereby are engaged by the plurality of second stop means, respectively, so that said bail will be turned by any selected one of said manually operable members after the transmission member carried thereby has been stopped by one of said second stop means and thus after the objective has been focused; shutter release means; and lever means carried by said support means in the path of turning movement of said bail when the latter is turned by any one of said manually operable members to be turned thereby, said lever means cooperating with said shutter release means for actuating the latter when said lever means is turned during turning movement of the bail.

7. In a camera, in combination, support means; a row of manually operable members located one above the other and carried and guided by said support means for rearward movement, each manually operable member having a front end accessible to the operator and an opposite rear end and each manually operable member being formed with a longitudinal groove extending from said rear end thereof forwardly but terminating short of said front end thereof; a plurality of racks respectively located in said grooves and being longitudinally slidable therein; a plurality of first stop means respectively carried by said plurality of operable members and cooperating with said racks for limiting the rearward movement thereof in said grooves, respectively; a plurality of spring means respectively carried by said plurality of manually operable members and cooperating with said racks for urging the latter rearwardly into engagement with said plurality of first stop means, respectively; a shaft turnably supported by said support means and extending perpendicularly to said racks; a plurality of pinions freely turnable on said shaft and respectively meshing with said racks, said manually operable members respectively having predetermined rest positions where said racks locate said pinions in predetermined angular positions on said shaft; a plurality of first motion transmitting pins respectively fixed to said shaft and extending radially therefrom respectively over said pinions; a plurality of second motion transmitting pins respectively carried by said pinions and extending axially therefrom parallel to said shaft, said first pins being respectively located in the paths of turning movement of said second pins when said pinions are turned by said racks and the angular distances between said first pins and the second pins which respectively cooperate therewith being different when said pinions are in said predetermined angular positions so that during movement of said manually operable members by the operator said plurality of second pins will respectively turn freely through different angular distances before engaging said first pins to turn said shaft, whereby said shaft will be turned through different angular distances depending upon which of said manually operable members is actauted by the operator; adjusting means carried by said support means and operatively connected with said shaft to be actuated thereby to different extents depending upon which of said manually operable members is actuated by the operator; an adjustable objective means operatively connected with said adjusting means to be adjusted thereby so that the setting of said objective means will be determined by which of said manually operable members is actuated by the operator; a plurailty of second stop means carried by said support means respectively in the paths of rearward movement of said racks to termiate the movement thereof with said manually operable members so as to terminate the adjustment of the objective; and means engaged by said manually operable members after the racks carried thereby have been stopped by said plurality of second stop means for releasing a shutter of the camera after the objective has been focused.

8. In a camera, in combination, support means; a row of manually operable members located one above the other and carried and guided by said support means for rearward movement, each manually operable member having a front end accessible to the operator and an opposite rear end and each manually operable member being formed with a longitudinal groove extending from said rear end thereof forwardly but terminating short of said front end thereof; a plurality of racks respectively located in said grooves and being longitudinally slidable therein; a plurality of first stop means respectively carried by said plurality of manually operable members and cooperating with said racks for limiting the rearward movement thereof in said grooves, respectively; a plurality of spring means respectively carried by said plurality of manually operable members and cooperating with said racks for urging the latter rearwardly into engagement with said plurality of first stop means, respectively; a shaft turnably supported by said support means and extending perpendicularly to said racks; a plurality of pinions freely turnable on said shaft and respectively meshing with said racks, said manually operable members respectively having predetermined rest positions where said racks locate said pinions in predetermined angular positions on said shaft; a plurality of first motion transmitting pins respectively fixed to said shaft and extending radially therefrom respectively over said pinions; a plurality of second motion transmitting pins respectively carried by said pinions and extending axially therefrom parallel to said shaft, said first pins being respectively located in the paths of turning movement of said second pins when said pinions are turned by said racks and the angular distances between said first pins and the second pins which respectively cooperate therewith being different when said pinions are in said predetermined angular positions so that during movement of said manually operable members by the operator said plurality of second pins will respectively turn freely through different angular distances before engaging said first pins to turn said shaft, whereby said shaft will be turned through different angular distances depending upon which of said manually operable members is actuated by the operator; adjusting means carried by said support means and operatively connected with said shaft to be actuated thereby to different extents depending upon which of said manually operable members is actuated by the operator; an adjustable objective means operatively connected with said adjusting means to be adjusted thereby so that the setting of said objective means will be determined by which of said manually operable members is actuated by the operator; a plurality of second stop means carried by said support means respectively in the paths of rearward movement of said racks to terminate the movement thereof with said manually operable members so as to terminate the adjustment of the objective; means engaged by said manually operable members after the racks carried thereby have been stopped by said plurality of second stop means for releasing a shutter of the camera after the objective has been focused; and spring means cooperating with said objective for returning the latter to an initial rest position after an exposure has been made, said adjusting means also being returned to an initial rest position when said spring means returns said objective to said rest position thereof.

References Cited in the file of this patent
UNITED STATES PATENTS
2,295,949    Holeka _____ Sept. 15, 1942